Aug. 10, 1965  J. MACATICIAN  3,199,352
HEAT TRANSFER GAUGE
Filed June 25, 1962

INVENTOR.
JOHN MACATICIAN
BY
William R. Wright
HIS AGENT

United States Patent Office 3,199,352
Patented Aug. 10, 1965

3,199,352
HEAT TRANSFER GAUGE
John Macatician, Ridge Road, Mountain Shore,
P.O. Box 136, Lake Hopatcong, N.J.
Filed June 25, 1962, Ser. No. 204,710
6 Claims. (Cl. 73—341)

The present invention relates to a heat flow measuring device and, in particular, to such a device which detects the extent of the heat flow and then yields an electrical signal equivalent to it. An electrical voltage is created which is a function of the amount of heat passing through the detecting means and the voltage is then read on a voltmeter, potentiometer, or the like, preferably calibrated directly in units of heat flow quantity.

A simple, easy to consrtuct but very sensitive and more accurate, and therefore more useful, heat transfer gauge is produced by the novel structure and arrangement of the present invention as will be apparent from the description which follows.

In the present invention, a thermopile is combined into a novel structural arrangement resulting in a heat transfer gauge of unusual effectiveness and efficiency. The thermocouple junctions of the thermopile are oriented such that they are in rows each row lying in a plane, or isotherm, and along a thermal gradient so that one row of junctions is located in a higher temperature region and the other row of junctions in a cooler temperature region. The separation of both planes is known with precision and is given the distance $\Delta x$ so that after the temperature is read from the gauge and its associated voltmeter or other instrumentation, the heat can be readily computed by utilization of the simple formula:

$$q = -kA\frac{\Delta T}{\Delta x}$$

where:
- $q$ = heat value
- $k$ = thermal conductivity
- $\Delta T$ = temperature increment
- $A$ = cross sectional area It is, therefore, an object of the present invention to provide a heat transfer gauge of great accuracy and quick reponse through a novel thermopile structure wherein the hotter thermocouple junctions and the colder thermocouple junctions of the thermopile each lie in a plane, or isotherm, and along a thermal gradient with the distance between the planes established precisely by the structure so that all junctions lying in one plane will detect the same temperature without error and yet many junctions can be used to give great sensitivity and intensity of signal.

Figure 1:
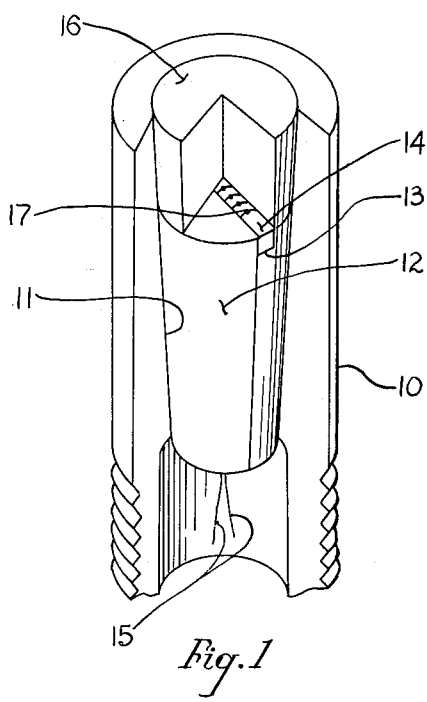
FIGURE 1 is a partially cutaway isometric view of the heat transfer gauge.

In the preferred embodiment of the present invention, with particular reference to FIGURE 1 of the drawings, will be seen a body or housing 10 of substantially cylindrical external cross section and having a tapered internal cavity or bore 11 with the longitudinal central axis of the bore 11 coincident with that of body 10. Cavity 11 extends through body 10 and its larger diameter is at the open or upper end of body 10 as shown in the drawing. A tapered plug 12 preferably split along its central axis for convenience in assembly, fits snugly into cavity 11. In the upper surface of plug 12 is a thermopile-receiving slot or groove 13 adapted to receive thermopile 14 in a position transverse of plug 12 with the upper surface of the thermopile substantially in alignment with the upper surface of the plug in the manner shown. The wire leads 15 of thermopile 14 extend downward between the split portions of plug 12 and pass out of it, being subsequently connected to a voltmeter (not shown). On top of plug 12 is located a tapered cover plug 16 which is tightly fitted into body 10. Because of the tapered, closely-fitted construction, no bonding of the parts with cement is necessary although it could be utilized if desired.

Figure 2:
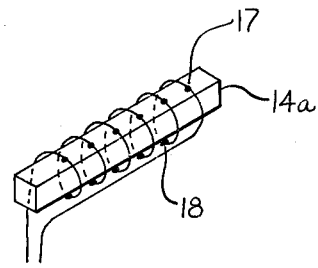
FIGURE 2 is a perspective view showing element 14 in enlarged detail.
Figure 3:
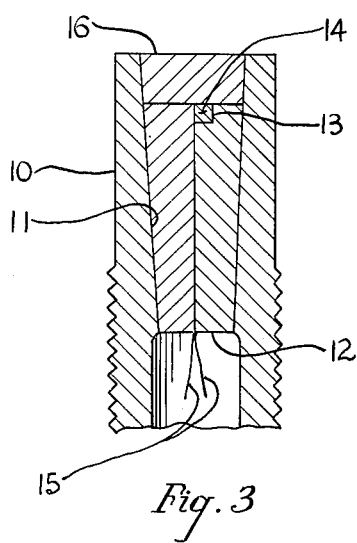
FIGURE 3 is a longitudinal cross-sectional view of the entire heat transfer gauge.

Thermopile 14 is preferably made in the form of a square bar 14a as shown in FIGURE 2 having thermocouple junctions 17 along its upper surface and thermocouple junctions 18 on the lower surface as shown. These are formed by passing the thermocouple wires or elements closely around the bar 14a as shown with one element of the thermocouple passing down one side of bar 14a and the other element passing up the other side to the next upper junction, junctions being made as the elements meet on both the upper and the undersides of bar 14a. The thermocouple wires and leads are electrically insulated except at the junctions so that there will be no interference with or loss of, the electrical signal by contact with the other parts of the gauge.

Bar 14a is made with precision so that its upper and lower plane surfaces are as nearly parallel as possible so that the distance between the upper and lower side thermocouples may be precisely known.

Body 10 is provided with threads or other suitable means for mounting it at the location where the temperature is to be measured with the upper end of the gauge (FIGURE 1) exposed to the area where the heat is to be measured.

In operation, the exposed upper end (FIGURE 1) of the gauge senses the temperature of the heat which passes through cover plug 16 to the upper surface of bar 14 and the thermocouple junctions 17 thereon. Heat then passes through bar 14a to its under surface and its temperature is measured there by thermocouple junctions 18 thereon. Since a finite distance is traversed from thermocouples 17 to thermocouples 18, there will be some drop in temperature and the latter will sense a colder temperature. The difference in temperature measured and the known distance between the upper and lower surfaces of the bar 14 are then applied to the simple formula described earlier in this specification and the heat value can be determined.

It is important to note that the upper and lower surfaces of bar 14a are accurately positioned so that the planes of its upper and lower surfaces are perpendicular to the central axis of the body 10. This ensures that thermocouple junctions 17 will all lie on an isotherm since they are equidistant from the exposure to the heat as also will junctions 18 lie on their isotherm for the same reason. Because of the thermal gradient which exists as heat passes downward through the bar 14a, or in reverse direction if the heat source be reduced in intensity, junctions 17 all simultaneously become the same temperature. This is also true of thermocouple junctions 18 which will be at a different temperature unless the temperature gradient should become zero in which case they would become identical. A particular advantage lies in this feature of the present invention since the advantages of a thermopile, i.e. multiple thermocouples, is gained without the inherent loss of accuracy due to temperature errors which would be present if the thermopile was not oriented in alignment with an isotherm. Thus, the present invention provides a highly sensitive gauge of greater accuracy than heretofore by virtue of its novel structure and orientation of parts.

Figure 4:
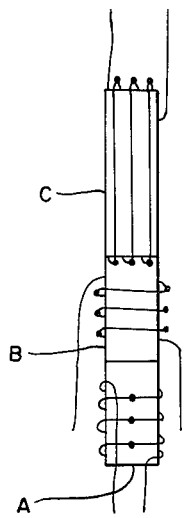
FIGURE 4 is a plan view showing another form of the thermopile.

As shown in FIGURE 4 thermopile bar 14a can also be made in three segments with thermocouple junctions on the upper and lower surfaces of segment A as previously, on the sides of segment B and on the ends of segment C. Separate insulated leads are carried away from each segment to a voltmeter or potentiometer as previously. The segmented bar is then installed in the body 10 in the same manner as previously described. Readings of temperature may then be taken in two additional perpendicular planes with the same improved sensitivity and accuracy.

It is to be understood that the form of the invention herewith shown and described is to be taken as a preferred example of the same and that various changes in the shape, size and arrangements of parts may be resorted to without departing from the spirit of the invention or the scope of the subjoined claims.

What is claimed is:

1. In a heat detecting element including a thermopile, the improvement comprising a body having a tapered cavity, a tapered plug forced into said body, a thermopile atop said plug, and a tapered cover plug forced into the remainder of said cavity atop said thermopile, and means to allow electrical connection to the thermopile.

2. The invention set forth in claim 1 with the tapered plug having a thermopile-receiving groove in its upper surface.

3. The invention set forth in claim 1 with the tapered plug split longitudinally.

4. In a heat transfer gauge for measuring the heat from a heat source, the improvement comprising a thermopile having thermocouple junctions arranged in at least two coplanar rows, means precisely separating said rows, the rows being mounted in substantially parallel relationship to the heat source with their common plane substantially perpendicular thereto, and mounting means for the thermopile including a tapered plug forced in a mating taper in a body, a thermopile receiving slot in said plug containing said thermopile, a tapered cover plug forced in said body, and means for allowing electrical leads from said thermopile to exit from the body.

5. A heat transfer gauge comprising a body adapted to be mounted adjacent to a heat source, a plurality of thermopiles each having two separated coplanar parallel rows of thermocouple junctions, means for mounting at least one thermopile in said body in substantially perpendicular relationship to the path of a thermal gradient from the heat source with one of said rows further from the heat source, and means for mounting at least one other thermopile with the common plane of its junctions substantially perpendicular to that of the first-named thermopile, and means for measuring the electrical signals from said plurality of thermopiles.

6. The invention set forth in claim 5 with at least one more such thermopile having the common plane of its junctions substantially perpendicular to those of the first-named and second-named thermocouples.

References Cited by the Examiner

UNITED STATES PATENTS

| | | | |
|---|---|---|---|
| 1,528,383 | 3/25 | Schmidt | 73—341 |
| 2,813,425 | 11/57 | Woolley | 73—359 |
| 2,938,122 | 5/60 | Cole | 73—359 |
| 2,987,564 | 6/61 | Imelmann | 136—4 |
| 3,018,663 | 1/62 | Dunlop | 73—343 |

FOREIGN PATENTS 569,791    10/58    Belgium.

ISAAC LISANN, *Primary Examiner.*